Feb. 1, 1944.                A. F. C. LOTZ ET AL                2,340,673
                    PLASTICITY CONTROL FOR BRICK MACHINES
                         Filed May 4, 1942        4 Sheets-Sheet 1

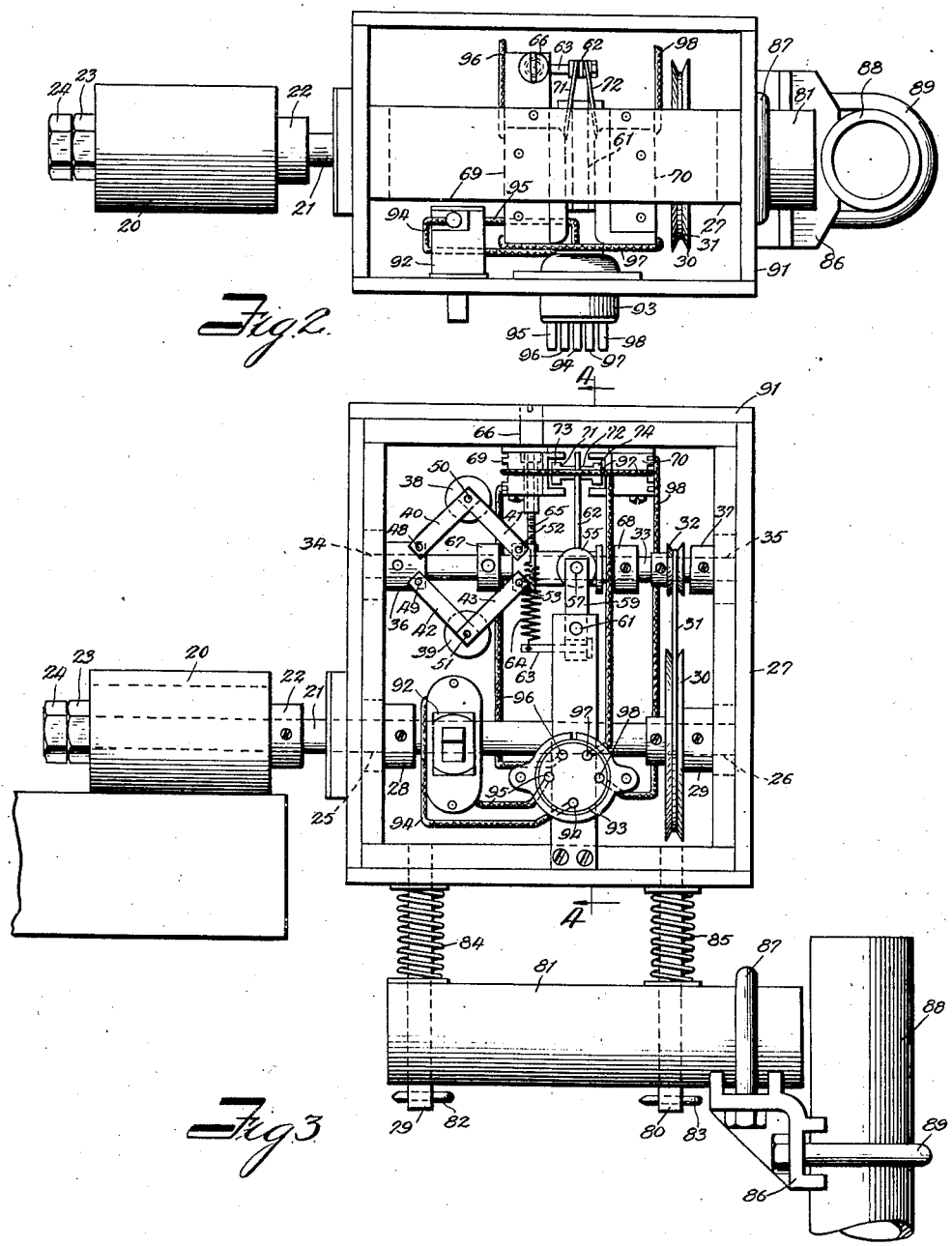

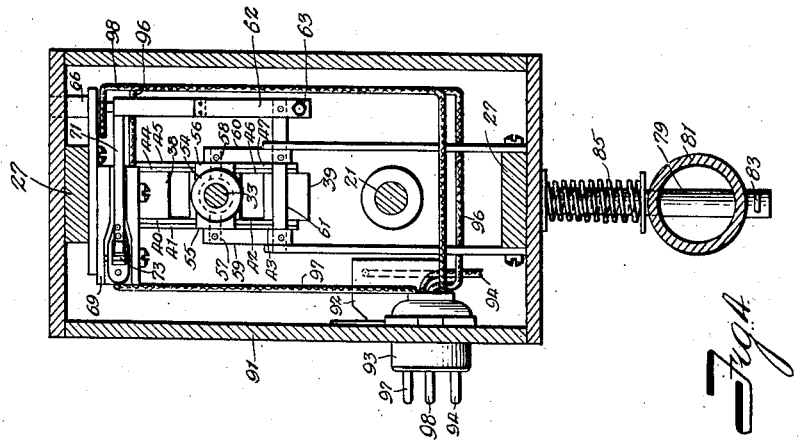
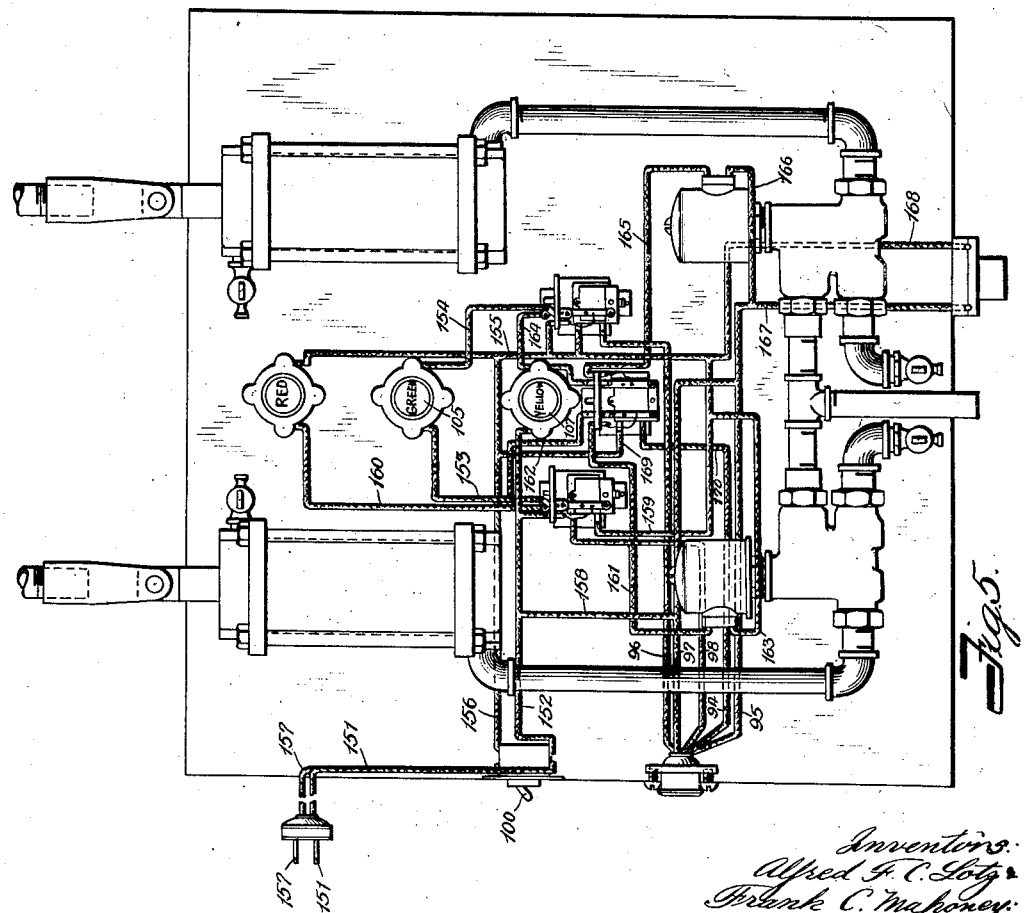

Feb. 1, 1944.  A. F. C. LOTZ ET AL  2,340,673
PLASTICITY CONTROL FOR BRICK MACHINES
Filed May 4, 1942  4 Sheets-Sheet 4

Inventors:
Alfred F. C. Lotz &
Frank C. Mahoney
By Thiess, Olsen & Mecklenburger, Attys Patented Feb. 1, 1944

2,340,673

UNITED STATES PATENT OFFICE 2,340,673

PLASTICITY CONTROL FOR BRICK MACHINES

Alfred F. C. Lotz and Frank C. Mahoney, Chicago, Ill.

Application May 4, 1942, Serial No. 441,638

10 Claims. (Cl. 25—11)

The present invention relates to means for controlling and regulating the plasticity of extruded material composed of a solid and a liquid component whose proportions relative to each other are determinative of the plasticity of the extruded material. The invention also relates to the method of controlling the plasticity of such materials, and thereby the speed of its extrusion and the regularity of the extruding operation.

More particularly, the invention relates to a method and apparatus for controlling and regulating the plasticity of an extruded material such as an argillaceous substance—for instance, clay—and is more particularly concerned with a novel method for increasing or decreasing the moisture content of a moving mass of argillaceous material such as clay or the like, so as to maintain substantially constant the plasticity of the material during its extrusion for the purpose of keeping the production substantially uniform.

It has already been proposed in the past to extrude various types of plastic material consisting of a solid and a liquid component, respectively, a good example of which operation is the extrusion of clay in the manufacture of bricks and tile. It has been customary to blend a gauging fluid, such as water, with an argillaceous material, such as clay, kaolin, and the like, and thereafter to extrude this material by means of an auger-type of extrusion press which forces the material through a die from which it issues in a continuous column which is either horizontally or vertically disposed. There are, however, many other types of extrusion processes in which a mixture of a liquid and a solid material in plastic form is extruded. The familiar example is the manufacture of spaghetti and macaroni in the food industry, while on the other hand extrusion of rubber and other plastic materials for the manufacture of rods and tubing represents another form of operation to which the present invention may be applied. This is particularly true if one of the components of the plastic mixture is a liquid, or at least a sufficiently flowable material to permit of its passing through pipes under the control of automatically or semi-automatically controlled valves so that it becomes possible to regulate and adjust the relative quantities of liquid to solid. Therefore, while the present invention will be explained primarily in connection with the manufacture of argillaceous materials such as clay and bricks, it is to be understood at the outset that this is merely for purposes of illustration and not for limitation.

Referring now more particularly to the clay or brick industry, the accepted clay-mixing methods and apparatus comprise generally a crusher or grinder for preparing the clay which is to be delivered to the means for mixing said clay with water. Such means are commonly pugmills or the like, the water or other gauging material being added to the ground argillaceous material which has been delivered to the pugmill, the amount of gauging material being predetermined to obtain the desired and proper degree of plasticity. Such a pugmill, for instance, will feed the clay in admixture with its gauging fluid or water to an auger machine, where the clay is further pugged and mixed as a result of the rotation of the auger, being finally extruded through a suitably shaped die to form a column of the desired shape, depending upon the finished product, such as brick, tile, and the like.

Water or other gauging fluid may be added to the clay in the pugmill if the clay is too hard and dry, while on the other hand the amount of gauging fluid or water is decreased if the clay should become too wet and too soft. This process has been termed "tempering," and is necessary because the raw clay as used is rarely of the correct consistency which would permit of its immediate use without resorting to the tempering operation. It will also be understood that the clay coming from the crusher is not uniformly dry or wet, as the case may be, over any given period of time, but that the dry and wet condition of the clay will alternate in varying degrees. Thus, rarely if ever can the clay from the crusher be used without tempering in one direction or the other so as to obtain the most desirable consistency and plasticity thereof for the desired and existing working conditions.

Tempering, that is to say the increasing or decreasing of the amount of water delivered to the clay in the pugmill, is usually left to the experience and judgment of the machine operator. This method is rather crude, and for effective operation requires a skilled attendant.

However, even though a skilled attendant is operating or supervising the operation of the pugmill, it occasionally happens that the consistency of the clay as it is extruded at the die of the auger machine will vary above or below the predetermined and desirable condition of plasticity, and it is difficult, if not impossible, to obtain a product of uniform plasticity by this old hand-operated method.

In accordance with the present invention, there will be described both a process and an apparatus for automatically controlling and maintaining the proper plasticity of clay in a continuous process of manufacture. In this method, the tempering—that is, the increase or decrease in the amount of water added at the pugmill—is automatically controlled so that manual attention is virtually eliminated once the clay has attained the desired plasticity and the extruded column thereof is moving at the proper predetermined speed. The principle of the operation employed in the hereinafter explained method is based upon the fact that the speed of the extruded column as it leaves the die of the auger machine is a function of the plasticity of the extruded product.

Keeping the above background in mind, one of the objects of the invention, therefore, is to provide a method for extruding a plastic material composed of a solid and a liquid component whose proportions relative to each other are determinative of the plasticity of the extruded material which comprises the combination of means for blending the solid and the liquid components, means for extruding the resulting mixture to produce a moving body of plastic material, means for constantly supplying the solid component, variable means for supplying the liquid component, and means responsive to the speed of the extruded body for controlling the aforementioned variable means whereby the speed of the extruded column is maintained at a predetermined value.

A further object of the invention is to provide means responsive to the speed of an extruded column of clay, which, by the instrumentalities hereinafter more fully described, will actuate through suitable electrical relays various servo-valves which in turn control the valves supplying the water or other gauging fluid to the clay or other material.

A further object of the invention is to provide means in an apparatus of the type indicated in the paragraph immediately hereinabove for automatically inactivating the apparatus in case of a shut-down or upon stopping the apparatus entirely so as to avoid flooding of the clay or other material with water.

A further object of the invention is to provide, in addition to the automatic control, visible means for indicating to the attendant or operator the present condition of the operation so that in case of emergency, appropriate steps can be taken to rectify the difficulty. These means may comprise colored lights, semaphores, bells, and the like.

Other objects of the invention will become manifest from the description and claims which follow hereinbelow.

For example, in the so-called stiff-mud method of making brick and tile, the clay is in a plastic state and is constantly extruded through the die by means of an auger machine. Inasmuch as the clay is, by virtue of its plasticity, more or less mobile, and the pressure of the screw in the auger machine which is forcing the clay through the die will cause the clay between the end of the screw and the extruding die to be under pressure, it will be self-evident that, with a given application of power and a given speed, the rate of extrusion will be roughly inversely proportional to the plasticity of the material. In other words, the more easily the material flows, that is to say, the more plastic it is, the more rapidly will it extrude with a given and constant input of power. Conversely, as the material becomes less plastic, it will become more difficult to extrude, and if the power input is kept constant, the rate of extrusion will obviously diminish.

If a definite plasticity of the clay has been decided upon as standard for the particular operation and the type of product manufactured, then if more moisture is added per unit of clay, it will become softer and more plastic, and hence will be extruded more easily as the pressure between the auger screw and the die will decrease. The result will be an increased speed in the extruded column of material. Conversely, if the water is reduced per unit of clay, the plasticity will become less and the clay will become stiffer and harder, from which it follows that the resistance between the auger screw and the die will become greater, thereby reducing the speed of the extruded column. It will thus be seen, therefore, that the speed of the column of extruded clay will vary with the plasticity of the clay, and is in fact a positive function of such plasticity. It will be noted that the relation between the plasticity of the clay and the speed of the extruded column is definite, and that the slightest difference in plasticity will effect a corresponding difference in the extruding speed of the column. That is to say, if a unit of speed per unit of time is taken as standard, then if the clay becomes harder, the speed will be reduced, and if the clay becomes softer, the speed will be increased. In the present invention the speed of the column is utilized for the purpose of automatically governing and controlling the operation of tempering the clay, thereby keeping it at a predetermined plasticity. In other words, the variations of the speed of the column will tend to keep it at a constant predetermined speed.

The control mechanism employed comprises a roller of pliable material which presses against the moving column of plastic material, thereby deriving its own movement. Self-evidently, the peripheral speed of this roller will be identical with the forward speed of the moving extruded clay column. Inasmuch as the pliable roller is affixed to a shaft, it becomes possible, as hereinafter more fully described, to employ this rotational movement to effect a suitably constructed governor which in turn controls a lever which normally is in a neutral position between a series of switches when the speed of the column is standard, but which lever will move to close one switch if the speed of the column is reduced—that is to say, when the clay becomes harder—and will open this switch when the speed is again standard, thereby returning the lever to its central or neutral position. On the other hand, when the speed of the column increases—that is, when the clay becomes soft—this lever will move in the opposite direction, thereby closing a second switch which is employed when the clay becomes too soft. The first switch, of course, will thereby still remain open. When the column again retains its standard speed, the lever will once more return to its neutral position between the two switches, thus leaving both of them open so long as the extruded column maintains its standard speed. The switches just mentioned are employed to energize certain relays which in turn will not only control the indicator lights or other indicating means, but also will actuate solenoid operated pressure valves which in turn impart movement through suitable links to valves which are interposed in the water supply line which controls the amount of water that is fed into the pugmill. For example, it might be possible to select a green light as indicative of the normal and desired operation of the apparatus, while using a red light if the clay becomes too hard and the speed of the column correspondingly decreases, and to use, say, a yellow light when the speed of the column is increased as the result of too great plasticity of the clay being extruded. Self-evidently, other indicating means, such as semaphores or differently-toned bells, might be employed. Moreover, the point at which this indication is given may be quite remote from the point of extrusion, and, in fact, the indicating means might be remote from the prime mover or actuating means which affects the indications.

As a result of the construction indicated, any change in the speed of the column will be reflected throughout the entire system of the correlated governor, solenoid actuated valves, pressure cylinders, and the water valves both in the main and the auxiliary water lines to the pugmill, one system corresponding to the harder and less plastic condition of the clay and consequent slower speed of the column of the extruded clay, while the other system with its corresponding similar apparatus will act when the clay is more plastic and therefore is moving at a correspondingly increased extrusion speed. There is also a manually operated cutout switch which opens and closes a separate double-pole, single-throw relay, each pole of which will be normally closed so as to complete the circuit of its corresponding solenoid of the pressure operated control valves and so arranged that when the manually operated switch is open, the circuits of both solenoids will be normally closed, and when the switch is closed, then the double-pole relay is energized and both solenoids will be in open circuits, thus rendering inactive both solenoids and their respective pressure valves, pressure cylinders and valves, at the same time, however, allowing the colored lights or other indicating means in the system to function normally.

Better to comprehend the necessity of the manually operated switch with its corresponding double-pole, single-throw relay and the solenoids thereby controlled, it may be well to explain at this point the ordinary daily operation of a clay plant producing brick, tile and the like. In such operation, for instance, a water supply line is provided leading to the pugmill, this pipe line supplying more water to the clay than is normally necessary to give it the required plasticity. A valve which normally is at full opening is operated by the pressure cylinder to close the same whenever the clay becomes too soft, but between this valve and the pugmill itself there is also interposed a manually controlled valve which latter can be used so as to control the proper predetermined amount of water which is to be fed into the clay in the pugmill. In other words, this manually controlled valve is set at a predetermined discharge rate. There is also provided a second pressure cylinder operated valve which is normally closed and is connected with the main water supply line and serves as an auxiliary supply to increase the water supply that is fed to the pugmill whenever the increased hardness of the clay renders it necessary.

Thus if the normal amount of water supplied to the pugmill is not sufficient, and hence the clay becomes too hard, this second valve will be automatically opened by its corresponding pressure cylinder, whereby a supply of water will be increased over that of the normal flow, thereby introducing more water into the clay, rendering it more plastic. It will be noticed that during this operation, the first mentioned pressure cylinder operated valve will be open, as will also be the manually controlled valve, which, however, will be set at its predetermined opening.

Thus the two pressure cylinder operated valves will automatically close and open alternately, as conditions require, thus decreasing or increasing the amount of water supplied to the pugmill.

However, when the pugmill and auger machine are not in operation, there will self-evidently be no movement in the extruded column, and consequently there will be no movement imparted to the pliable roller which is in contact with the column. Thus a lack of motion will therefore operate just as though the material had become harder, and the result will be that the governor operated lever will close the switch responding to slow speed conditions of the column, whereupon the corresponding relay will then energize its solenoid operated valve and pressure cylinder, thereby opening the auxiliary valve admitting more water to the pugmill while at the same time the green light will be extinguished and the red light will be lit. Under these conditions, obviously due to the shut-down of the pugmill and auger machine, the clay would be flooded. It therefore becomes necessary to supply means for combatting this condition. Thus there is provided a manually operated cutout switch which operates the aforementioned double-pole, single-throw relay in order to break the circuits in the solenoids which control the valves, while at the same time it is necessary to close the manually operated valve in the main supply line as otherwise water would continue to flow into the pugmill. At the same time, due to the circuits in the construction, both the green and yellow lights will be extinguished but the red light will remain lit and visible.

When the pugmill and auger machine are again placed in operation, then the manually operated valve in the main water supply line is opened to the predetermined degree and the red light will continue to be visible until the column which now begins to be extruded has attained its standard speed, whereupon the red light will go out and the green light will go on. When this has been done, then the manually operated cutout switch is opened, thereby restoring the circuit leading to the solenoids, whereupon the entire regulating system will again be placed in condition of normal operation so that it may again automatically control the tempering process in the pugmill and auger machine.

By co-operation of the correlated apparatus, briefly hereinabove described, there is therefore accomplished a perfect tempering of the clay in a novel and efficient manner.

While there has been described so far the use of solenoid operated air valves or pressure cylinders, and the use of air pressure for operating the same, all controlled by double-pole, single-throw relays, it is to be understood, however, that the invention is by no means to be limited exclusively to their use, and that the said solenoid operated valves, pressure cylinders, and the air pressure used for operating the same may be eliminated, and that the corresponding relays operating the same may, for example, be connected to direct acting solenoids or to electrically operated control valves located in the main or auxiliary supply lines. Such direct-acting solenoid or electrically operated control valves will then be connected to the double-pole, single-throw relays at the points described for the solenoid connections of the solenoid operated pressure valves, thus eliminating said solenoid operated pressure valves, pressure cylinders, and air pressure for their operation. All this will be more fully understood by reference to a diagrammatic view of the apparatus and system involved in the practice of the present invention. In the hereunto appended drawings, Figure 1 is an entirely diagrammatic representation of the system without any regard to scale or precise arrangement;

Fig. 2 is a top view of what is herein termed the "prime mover" which comprises the control switches and the governor;

Fig. 3 is an elevational side view of the apparatus with the side removed, showing the governor actuated switches, etc., as well as means for supporting the apparatus and for permitting contact with the moving extruded clay column;

Fig. 4 is a side view of the same apparatus shown in Fig. 3;

Fig. 5 is an elevational view of the control mechanism which operates the air pressure valves and the thereby operated water supply valves.

Figure 1:
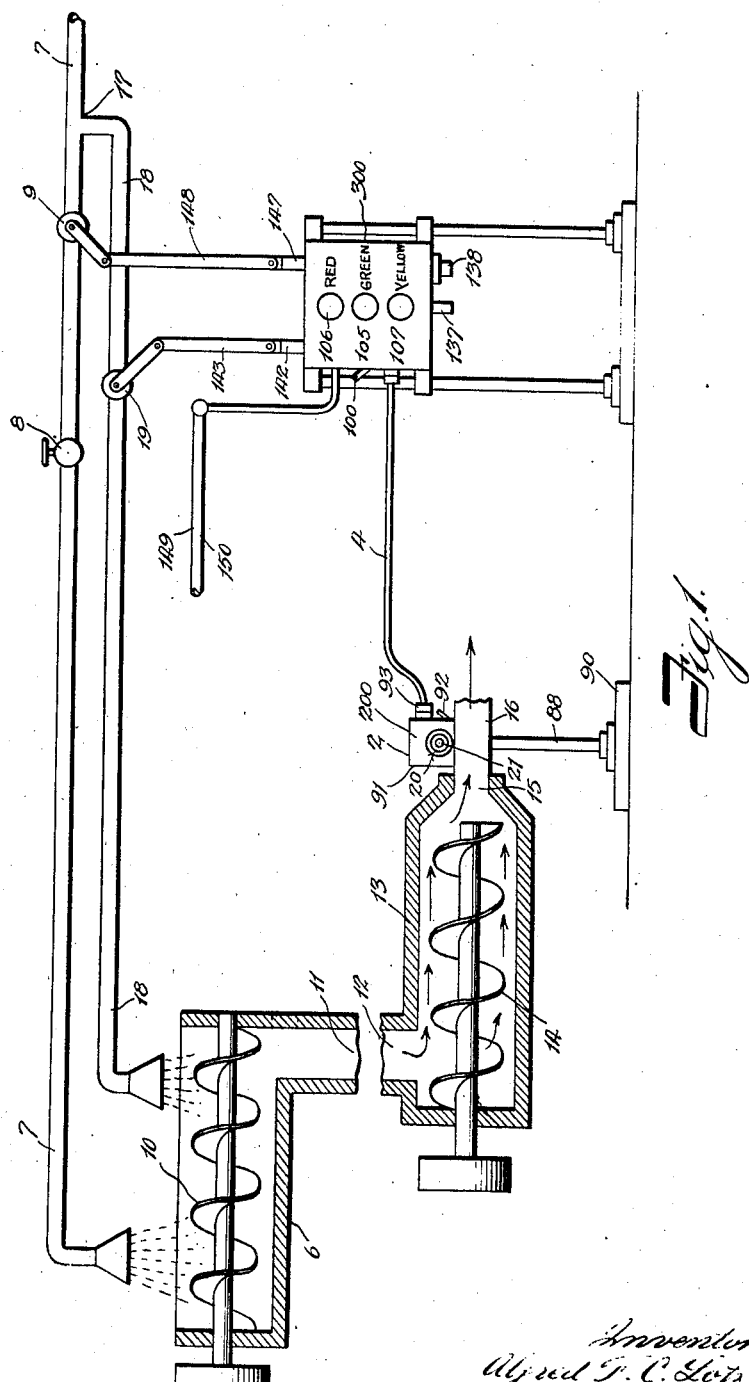

Referring now particularly to Fig. 1, the system comprises various parts and apparatus in cooperative assembly as explained below.

A pugmill 6 is fed in the regular manner with ground clay, and is mixed with water from the main supply pipe 7, which is of sufficient size that it will supply more water than is required. A manually operated valve 8 is placed in the pipe 7 so as to regulate the normal flow of water to the pugmill 6, and can also be used to stop the flow of water entirely. A second valve 9 is placed between the valve 8 and the water supply to the pipe 7. The valve 9 will be normally in open position. When the flow of water from pipe 7, regulated by the valve 8, is of the amount required by the clay in the pugmill 6, the mixture of clay and water is churned or pugged by the screw 10 in the pugmill 6, and forced to the opening 11 of pugmill 6, when the mixture will drop into the opening 12 of the auger machine 13. The auger 14, in the auger machine 13, will further pug the clay and water and drive the mixture through the die 15, thus forming the column of extruded clay 16, which will move in the direction shown by the arrow. An auxiliary water supply line 18 is tapped into the main water supply line 7 at the point 17 and placed ahead of the valve 9 in line 7. Line 18 is used to supply additional water to the pugmill 6 in the event that the clay in pugmill 6 becomes hard and has a tendency to increase the pressure in the auger machine 13 and decrease the speed of extrusion of the column 16. A valve 19 is placed in the auxiliary pipe line 18. This valve is normally closed and operates only when the clay in the auger machine becomes too hard, and supplies additional water to the clay in pugmill 6 so that the plasticity of the clay will be increased, and, due to decreased resistance at the die 15, the speed of the column 16 will be increased to the point of normal extrusion per unit of normally tempered clay per unit of time, equivalent to normal production.

When valve 19 automatically lets more water flow to pugmill 6, valve 8 and valve 9 will remain in their normal open position. When the clay in pugmill 6 becomes too soft, and consequently the speed of the column 16 increases, the valve 9 will automatically close to decrease the water supply to pugmill 6, thereby decreasing the plasticity of the clay in pugmill 6, so that the speed of the column 16 will be decreased toward the point of normal extrusion per unit of prescribed time. During this operation of valve 9, the valve 8 will remain open to the degree at which it has been set and valve 19 will remain closed.

When column 16 is being extruded at normal requirements, valve 9 will be in full open position and valve 19 will be closed.

Having thus far described the apparatus and its operation, there will now be described in detail the balance of the apparatus which in connection with the above forms a complete automatic tempering system.

Figure 6:
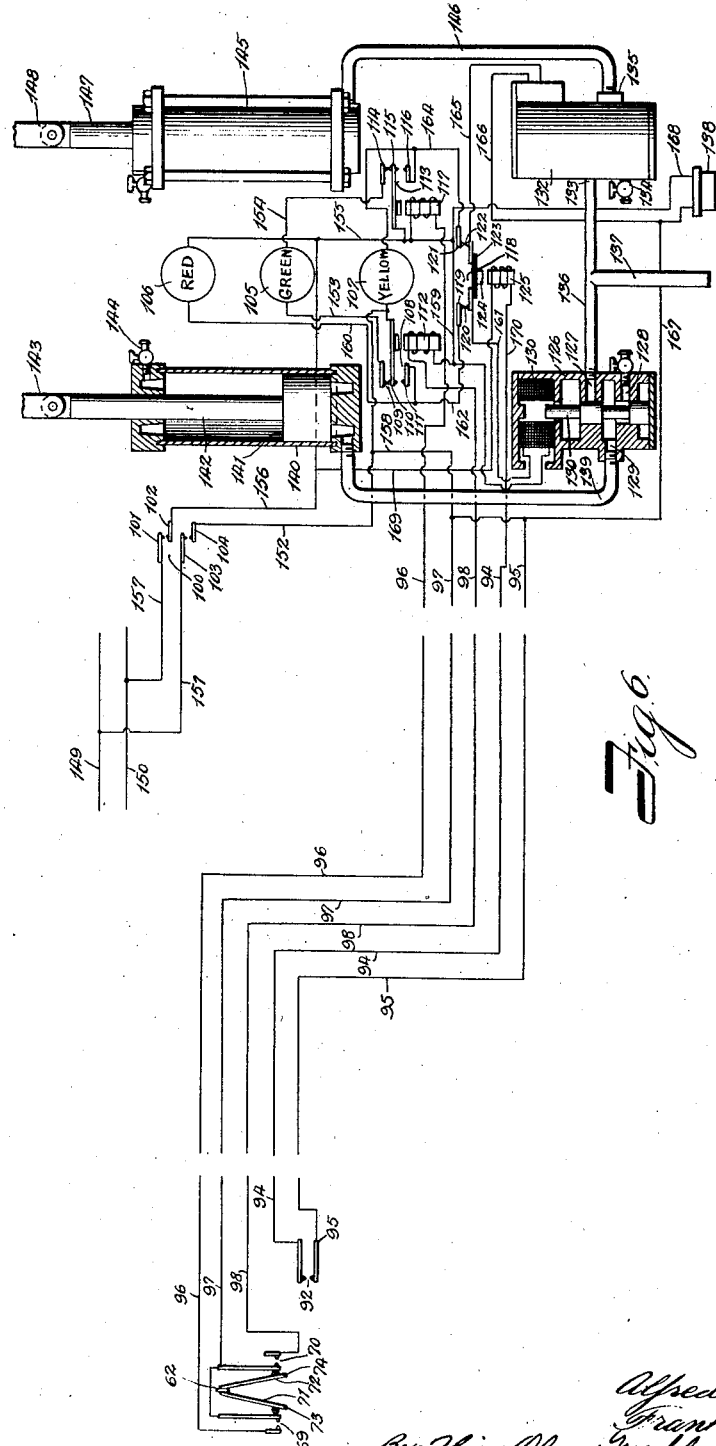
Fig. 6 is a diagrammatic drawing incorporating the essential features of Fig. 5, plus the wiring diagram which shows its connection with the switch shown in Figs. 2, 3, and 4.

The moving column 16 of plastic material (clay) actuates a roller 20 made of pliable material in order to effect good contact and to insure a peripheral speed equal to the speed of the column 16. This actuates the prime mover broadly designated by the reference numeral 200 which is electrically connected with the valve control unit broadly designated as 300 by means of a multi-wire cable 4. This control unit is described in connection with Figs. 5 and 6.

Referring now primarily to Figs. 2, 3 and 4 which illustrate the details of the prime mover 200, it will be seen that the roller 20 is rigidly fastened to the shaft 21 by being held under pressure against the collar 22 which is an integral part of the shaft 21, the necessary pressure being obtained by the nuts 23 and 24. The shaft 21 rotates in the bearings 25 and 26 provided in the frame 27. The shaft 21 is prevented from lateral displacement by collars 28 and 29 which are rigidly fastened to the shaft 21. A means for transmitting the rotary motion of shaft 21 to the coordinating mechanism of the governor is provided by the pulley 30 which is fastened to shaft 21 and rotates with same. A continuous belt 31 imparts the motion of pulley 30 to a pulley 32, which is fastened to the shaft 33. It is to be understood that although a pulley transmission is shown, any other method of transmitting motion may be employed, such as a train of gears, sprocket wheels and chain, and the like. Shaft 33 rotates in the bearings 34 and 35 in the frame 27. Lateral movement of shaft 33 is prevented by the fixed governor head 36, which is a square block with the shaft 33 running through its center. Block 36 is rigidly fastened to shaft 33. The collar 37 is also fastened to shaft 33 to prevent lateral motion. Two governor balls 38 and 39 are placed on opposite sides of shaft 33 and are held equidistant from the center of shaft 33 by links of equal length 40, 41, 42, 43, 44, 45, 46 and 47, and are symmetrically placed and loosely connected to the fixed head 36 at pivot points 48 and 49 and to the governor balls 38 and 39 at pivot points 50 and 51 and at pivot points 52 and 53. The corresponding links are connected to a movable crosshead 54.

The movable crosshead 54 consists of a square block having a square shoulder at each end, and the space between said ends is round, forming a cylindrical section. A round hole runs through the length of the crosshead to permit of its being mounted on shaft 33, and so arranged that crosshead 54 will move freely on shaft 33. When the governor balls 38 and 39 as a result of centrifugal force change their distance from the center of shaft 33, the crosshead 54 will be moved to the left (as viewed in Fig. 2) when the speed becomes greater, or to the right when the speed is less than the prescribed predetermined standard speed. The crosshead 54 revolves between the roller 55 and roller 56 arranged to revolve freely on their respective pins 57 and 58, forming a part of levers 59 and 60 respectively, fastened rigidly on shaft 61 and in line with each other. Shaft 61 is supported in the upright members of frame 27 and revolves freely therein.

A switch operating lever 62 is also rigidly fastened to shaft 61 and in line with levers 59 and 60. A pin 63 is tightly fastened to lever 62 and constitutes an entity with the same. To pin 63 is fastened a regulating spring 64, the other end of which is fastened to regulating screw 65, an end of which engages in the movable nut 66 supported on and moving freely on a projection of the frame 27.

When the governor balls 38 and 39 are in neutral operating position, the tension on spring 64 is adjusted by rotating nut 66 so as to bring the switch operating lever 62 into neutral position, thus corresponding to the normal predetermined speed of the column 16. The tension of spring 64 also reacts on rollers 55 and 56 to press the same on the shoulder of crosshead 54, thus causing crosshead 54 to be moved to the right (as viewed in Fig. 2) when the centrifugal action of the governor balls is lessened on account of the decreased speed of column 16. Adjustable stops 67 and 68 are placed on either side of crosshead 54 on shaft 33 to limit the travel of crosshead 54.

Two single-pole single-throw snap switches 69 and 70, of standard design, are fastened to frame 27 in right and left hand positions, their corresponding operating levers 71 and 72 being pivoted on their respective pivot points 73 and 74. Levers 71 and 72 are electrically insulated from the parts forming the electrical contacts 75 and 76 in switch 69, and contacts 77 and 78 in switch 70. Operating switch levers 71 and 72 are placed so that they will both be in mechanical contact with movable lever 62 when the lever 62 is in neutral position due to the normal speed of column 16 so that thus both switches 69 and 70 will be in open circuit. When lever 62 moves to the right (as viewed in Fig. 2), switch 70 will be closed and switch 69 will be open. When lever 62 moves to the left, switch 69 will be closed and switch 70 will be open. When lever 62 returns to neutral position both switches 69 and 70 will be open. Pins 79 and 80 are fastened to the lower part of frame 27 and pass loosely through a supporting bracket 81. Pins 79 and 80 are held in place by cotter pins 82 and 83 respectively. Compensating springs 84 and 85 are placed between the frame 27 and bracket 81 to balance the weight above springs 84 and 85 and allow adjustment of the pressure of roller 20 on column 16 through the upward or downward movement of bracket 81 relative to column 16. Bracket 81 is held in horizontal position by clamp 86 and U bolt 87. Clamp 86 is held to the vertical supporting pipe 88 by U bolt 89. Clamp 86 is adjustable up and down on pipe 88 so as to obtain the proper pressure of roller 20 on column 16. Pipe 88 is fastened to a baseboard 90 in a conventional manner. Baseboard 90 rests on the floor and keeps the pipe 88 in a vertical position.

A cover 91 is fastened to frame 27 so as entirely to enclose all of the parts supported by frame 27. On one face of cover 91 are fastened a single-pole single-throw switch 92, of conventional design, and a multicontact male plug 93 with protruding contacts 94, 95, 96, 97 and 98. In order to facilitate the path of the electric current passing through the contacts 94, 95, 96, 97 and 98 of the male plug 93, the wires connecting to these contacts are given the same numbers as the contacts.

The valve control mechanism shown in Fig. 5 consists of a mounting board 99 on which are rigidly fastened the mechanical and electrical devices with their respective electrical connections to make a complete unit, and as such can be mounted in a vertical position at any convenient place in the plant and at any distance from the prime mover 200, depending on the desired length of the connecting cable. The various pieces of apparatus fastened to the control panel 99 consist of a single-pole double-throw power switch 100 whose companion contacts 101 and 102 on one side are normally open and the contacts 103 and 104 on the other side are also normally open, and when contacts 101 and 103 are simultaneously depressed to make contact with 102 and 104 respectively, the circuits leading to the switch will be completed. It is to be noted that each piece of apparatus shown in Fig. 5 is of standard commercial design and therefore does not require a detailed description and is consequently depicted in purely diagrammatic form. A series of visible indicator lights of different colors is mounted on board 99 as follows: a green light 105 shows normal operation, a red light 106 shows decreased speed of column 16, and a yellow light 107 shows increased speed of column 16. When green light 105 is visible, lights 106 and 107 are out. When red light 106 is on, lights 105 and 107 are out, and when yellow light 107 is on, lights 105 and 106 are out. 108 is a double-pole single-throw relay consisting of a stationary contact 109, normally in closed contact with movable contact 110, a stationary lower contact 111 which is in normal open position with reference to contact 110, and an electromagnet 112 which, when energized, will act on contact 110, closing the circuit with contact 111, and when de-energized will open contact between 110 and 111, and close contact between 110 and 109. Contact 110 is spring-operated to normally be in closed circuit with contact 109. Relay 113 is a duplicate of relay 108 with its corresponding upper contact 114, movable contact 115, lower contact 116 and electromagnet 117.

There is also provided a double-pole, single-throw relay 118 whose upper stationary contact 119 is normally closed with movable contact 120, and upper stationary contact 121 is normally closed with movable contact 122. Contacts 120 and 122 are insulated from each other on base 123 to which is fastened a magnetic core 124. Contacts 120 and 122, base 123 and core 124 comprise a working unit which is held against contacts 119 and 121 by spring action. An electromagnet 125, when energized, will pull down the unit comprised of 120, 122, 123, and 124, and will open the respective circuits between 119 and 120 on one side and 121 and 122 on the other side.

A solenoid operated three-way valve 126 is also provided, whose inlet port 127 is normally closed, exhaust port 128 is normally open, and supply port 129 is always open. A piston plunger 130 in its down position normally closes port 127 and opens port 128. When solenoid 131 is energized, plunger 130 is pulled up and port 127 is open to pressure, port 128 is closed and pressure from port 127 is transmitted to port 129. When solenoid 131 is de-energized, plunger 130 drops down to close port 127 and open exhaust port 128, thus letting air under pressure escape to the atmosphere through port 128.

There is also a valve 132, a duplicate of valve 126, similar in construction, and provided with corresponding inlet port 133, exhaust port 134, and pressure port 135. Ports 127 and 133 are connected by a common inlet pressure pipe 136, which has a branch pipe 137 connected to it.

Pipe 137 is connected to any source of compressed air to supply pressure to valves 126 and 132. A standard socket 138 is supplied so that an electrically operated air compressor may be connected to the valve control system to actuate the same. Pipe 139 connects with port 129 of valve 126 and also connects with pressure cylinder 140 containing piston 141 and piston rod 142 which extends through the top of cylinder 140 and is connected with the operating arm of valve 19 by means of the link 143. A regulating exhaust valve 144 is placed at the top of cylinder 140 and may be opened or closed to regulate the exhaust from cylinder 140, thereby controlling the speed at which piston 141 will ascend by more or less compressing the air in the cylinder, and conversely will regulate the downward stroke of piston 141 by the intake of air in slower or faster degree. The piston 141 is returned to its normal down position by gravity.

There is also an air pressure cylinder 145, similar to cylinder 140, which is connected to port 135 of valve 132 by means of pipe 146. The piston rod 147 of cylinder 145 is connected to operating arm of valve 19 by means of link 148.

Having described in detail all the mechanical and electrical devices used in the entire system, there now follows a description of the consecutive actions of these devices when the complete system is in actual operation. Starting with the column 16 running at normal operation and therefore with the control system in neutral position, the electrical current from the power wires 149 and 150 will pass from wire 149 to wire 151 through switch 100, whose contacts are normally closed, through contacts 103 and 104, to wire 152, and will connect with the yellow light 107 and the movable contact 110 of relay 108 from contact 110, through stationary contact 109 of relay 108 to wire 153, through green light 105 to wire 154, through upper stationary contact 114 to movable contact 115 of relay 113. Contact 115 connects with wire 155 which connects with return wire 156 through closed contacts 102 and 101 of switch 100 to wire 157 to the return power wire 150. Thus it will be seen that relay 108, green light 105 and relay 113 are normally in series so that if either relay 108 or 113 is actuated, the green light 105 will be disconnected and therefore not visible. Should the clay become hard and the speed of column 16 decrease, the centrifugal force of governor balls 38 and 39 will become less and will be overcome by the tension on spring 64 which causes the arm 62 to press against lever 72, thus closing contacts 97 and 98 of switch 70. The current will now pass from wire 152 to branch 158 to wire 97 and closed contacts of switch 70, to wire 98 through solenoid of magnet 112 of relay 108, from said solenoid to wire 159, to 155, to 156, through contacts 101 and 102 of switch 100, to wire 157 and thence to return wire 150 of the power circuit. The solenoid of magnet 112 will be energized and open contact 110 from 109 of relay 108 and close contact 110 with contact 111 of relay 108. The current to the green light will thus be disconnected. The current from 152 will now pass through movable contact 110 to contact 111 connected with wire 160, through red light 106 to wire 155, to wire 156, through contacts 101 and 102 of switch 100 to wire 157, to return power wire 150. Thus it will be seen that red light 106 will now be visible and green light 105 will not show.

The solenoid 131 of three-way valve 126 is connected by wire 161 to movable contact 120 to stationary contact 119 of relay 118, and from contact 119 to wire 162 which connects to wire 160. The other end of solenoid 131 connects with wire 163. Thus it will be seen that solenoid 131 is connected in parallel with red light 106 and will be actuated at the same time that red light 106 is made visible. The current for solenoid 131 will come from wire 162 through contacts 119 and 120 of relay 118 to wire 161 through solenoid 131 to wire 163 which connects with wire 159.

When solenoid 131 is energized, the plunger 130 will be pulled up, opening port 127 and closing port 128 of valve 126. The air pressure in pipe 137 will now pass through pipe 136 to port 127 to port 129, through pipe 139 to pressure cylinder 140, acting on piston 141 and forcing same up to act on connecting link 143 and then on lever arm of valve 19, thus opening valve 19 and allowing more water to go to pugmill 6. This water will flow from pipe 7 to pipe 18 and will be in addition to the normal water supply from pipe 7. With the addition of more water to pugmill 6, the clay will become softer and the speed of column will become greater until it again reaches its normal speed. The centrifugal force of governor balls 38 and 39 will increase to the point where the tension of spring 64 is balanced and lever 62 is brought back to neutral position, when contacts 97 and 98 of switch 70 will be opened and all circuits affected by contacts 97 and 98 of switch 70 will become dead. The plunger 130 of valve 126 will then return to normal position and close port 127, thus shutting off the pressure from pipe 136 and opening port 128 to the atmosphere. Piston 141 will then return to normal position by gravity and exhaust the air through pipe 139, port 129 and port 128. When piston 141 moves down it will close valve 19, thus shutting off the auxiliary water supply from pipe 18 to pugmill 6.

When lever 62 returns to normal position, solenoid of magnet 112 will be de-energized and contacts 110 and 111 will be opened, breaking the circuit to red light 106, and contact 110 will again connect with contact 109 and thus re-establish the current through green light 105 and the whole system will again be in neutral or normal condition.

Should the clay in auger machine 13 become too soft, the speed of column 16 will become greater and the centrifugal force of governor balls 38 and 39 will increase and overcome the tension of spring 64, thereby causing the lever 62 to close the contacts 96 and 97 of switch 69, causing the current to flow from wire 158 to 97, through contacts 97 and 96 in switch 69, along 96 through solenoid of magnet 117, the other end of said solenoid connecting to wire 155 and then to wire 156, through contacts 401 and 402, and wire 157 to return power wire 150. This will energize magnet 117, pull down contact 115, and open the circuit between contacts 114 and 115, thus extinguishing green light 105. At the same time contact 115 will connect with contact 116, connected to wire 164, which in turn connects to yellow light 107 and contact 121 of relay 118. Contact 122 of relay 118 connects with movable contact 123 to wire 165, to solenoid in valve 132, from solenoid to wire 166, which connects to one side of socket 138, and to wire 167 which connects with wires 95 and 97. The other contact of socket 138 connects to wire 168, and this connects to wire 155. When solenoid in valve 132 is energized, the plunger in valve 132 will open port 133 and close port 134. This will now allow fluid under pressure from pipes 137 and 136 to pass through valve 132 to port 135, pipe 146 to cylinder 145, and cause piston in cylinder 145 to be pushed upward. Piston rod 147 of valve 145 is connected through link 148 to operating arm of valve 9 in pipe 7. The upper movement of piston rod 147 will thus close valve 9 and decrease the normal flow of water from pipe 7 to pugmill 6. Meanwhile valve 19 is closed. Decreasing the water supply to pugmill 6 will decrease the plasticity of the clay in the pugmill and cause the same to become harder, this also applying to the clay in auger machine 13. The speed of column 16 will thus be retarded and when column 16 is again at normal speed, lever 62 will again be in neutral position. This will open contacts in switch 69, said contacts being connected to wires 96 and 97, and the whole system will again be in normal or neutral operating condition and the yellow light will be cut out and the green light become visible. The plunger of valve 132 will now fall down and close port 133 and open exhaust port 134, thus removing the pressure to the piston in valve 145 and allow same to return to normal down position by gravity. This will open valve 9 and allow the normal flow of water from pipe 7 to the pugmill 6.

If for any reason the pugmill 6 and auger machine 13 are shut down and column 16 comes to rest, the regulating system would act the same as if the clay were too hard and would therefore automatically open auxiliary valve 19, thus causing an increase of water supply to pugmill 6, and as there is no movement of clay in pugmill 6, the clay would be flooded and become too soft to operate satisfactorily. To prevent this, the hand valve 8 in pipe 7 should be closed and switch 92 on prime mover (Fig. 2) should be closed through the contacts connected to wires 94 and 95. This will cause current from wire 156 to pass through wire 169, through magnet coil 125 to wire 170 which connects with 94 through closed contacts of switch 92, to wire 95, to wire 158, to wire 152, and thus back to power wire 150. This will energize magnet 125 which will pull down armature 124 and the contacts 120 and 122, thus breaking the circuits of the solenoids of valves 126 and 132, making same inoperative.

When the auger machine 13 and the pugmill 6 are again placed in operation and column 16 attains normal speed, the green light will again appear and switch 92 is opened, as is also valve 8. Thus the entire system will again be in neutral position and normal automatic operation.

It is of course evident that various modifications may be devised regarding the details of construction of various parts as well as the embodiment of the invention as a whole. The invention may be used in connection with the preparation and manufacture of widely different materials apart from its use as described in the preparation of clay. Many other changes may be devised, either in the details of the parts or in the operation of the entire system to accomplish the end desired through the principles described. We therefore desire it to be understood that what we have described and shown is intended to represent one embodiment for the purpose of teaching others how the invention may be applied to practical use, but not for the purpose of indicating the limitations of the invention either in its details or in its entirety.

We have defined in the following claims what we believe is new in the art, and we intend to use and to apply the invention within the scope and meaning of these claims.

We claim as our invention:

1. In an apparatus for extruding plastic clay bodies composed of clay and water, means for blending the clay and water to produce a plastic extrudable clay mixture, means for extruding said mixture to produce a moving column of plastic clay, means for constantly supplying clay, variable means for supplying water for admixture with said clay, and means responsive to variations in the speed of the extruded clay column to regulate the means supplying said water, whereby the speed of the extruded column of clay is maintained substantially at a predetermined value.

2. In an apparatus for extruding plastic clay bodies composed of clay and water, means for blending the clay and water to produce a plastic extrudable clay mixture, means for extruding said mixture to produce a moving column of plastic clay, means for constantly supplying clay, means for supplying water for admixture with said clay at a fixed predetermined rate, a second means for supplying additional water to said clay under conditions when the first mentioned means is inadequate to produce a clay mixture of the desired degree of plasticity, and means responsive to variations in the speed of said column whereby when the column slows down said second means will become actuated to supply additional water to said clay.

3. A clay tempering and extruding system comprising the combination of means for blunging clay with water, means for extruding said blunged clay into the form of a moving column of clay, means for supplying water for the blunging operation, means for supplying auxiliary water for admixture with said clay, means for throttling the first mentioned means of supplying water, means responsive to a decrease in the speed of the extruded column to regulate the auxiliary supply, means responsive to an increase in the speed of the column to actuate said throttling means, and means for inactivating both the auxiliary and the throttling means when the column is at rest.

4. In a system for preparing plastic material having a mixing machine and an extrusion machine disposed in serial relation, the combination of a fluid supply means co-operating with said mixing machine for tempering the material supplied to said extrusion machine, and a control apparatus driven by and dependent upon the speed of the extruded column of plastic material from the extrusion machine, said control apparatus co-operating with the movement of the extruded column of plastic material to regulate the fluid supply to the mixing machine.

5. In a system of preparing plastic material having a mixing and an extrusion machine disposed in serial relation, the combination of a supply means of fluid material to said mixing machine for tempering said plastic material, and a control apparatus responsive to the movement of the column of extruded material for automatically proportioning the fluid supply to the material in the mixing machine.

6. In a system of preparing plastic material having a mixing machine and an extrusion machine disposed in serial relation, the combination of a means of fluid supply to the material in the mixing machine, and an automatic electromechanical control apparatus deriving its motion from the speed of the extruded column from the extrusion machine, the variations of speed of said control apparatus depending upon the variations of the speed of said extruded column, and automatically controlling the fluid supply to the material in the mixing machine and extruding machine, increasing the fluid supply to the mixing machine when the speed of the extruded column decreases, and decreasing the fluid supply to the mixing machine when the speed of the extruded column from the extruding machine increases.

7. In a system for preparing clay having a pugmill and an auger machine in serial relation, the combination of a means of water supply to said pugmill for tempering the clay being fed to the auger machine, a responsive control apparatus actuated by and dependent upon the speed of the extruded column of clay, said control apparatus being in neutral position when the column of clay is being extruded at a predetermined speed, and causing the water supply to the clay in the pugmill to be increased when the speed of the extruded column is decreased from the predetermined speed, and decreased when the speed of the column of extruded clay is increased, and means for causing the responsive control apparatus to return to neutral position when the extruded column again is at the said predetermined speed.

8. A system for preparing clay, comprising a pugmill for treating and feeding tempered clay to a therewith correlated auger machine, a means for supplying water to said pugmill, a responsive rotatable regulator actuated by and dependent upon the speed of the extruded column of the auger machine, a pressure lever actuated by the movement of said rotatable regulator, said pressure lever being in neutral position when the extruded column is moving at a predetermined speed, movable contact means operated by movement of said pressure lever, stationary contact means in juxtaposition with movable means, said contact means being in open position when said pressure lever is in neutral position, and when the column from the auger machine is moving at a predetermined speed, said pressure lever closing one set of contacts when the speed of extruded column is decreased, and through correlated electromechanical valve means increasing the water supply to the pugmill, said pressure lever opening said contact means when said pressure lever returns to neutral position, said pressure lever closing a second contact means when the speed of the extruded column is increased, and through correlated electromechanical valve means causing a decreased supply of water to the pugmill, said pressure lever returning to neutral position when the extruded column has regained its normal predetermined speed, when said contact means and said correlated electromechanical valve means will become inactive, whereby the plasticity and the speed of the extruded column at the point of extrusion will be controlled.

9. In a control system of the type described, the sub-combination of a control mechanism comprising a supporting frame, two shafts rotatably supported thereon, a rotatable member affixed to one of said shafts for contacting a substantially constantly moving body of plastic material, means connecting said shafts so as to transfer motion from one to the other, a governor on one of said shafts, means operated by said governor to actuate a lever in one or the other direction, two electrical switches positioned one on each side of said lever, said lever being capable, under the influence of said governor, of contacting either of said switches alternately and of remaining in a neutral intermediate position between said switches when the speed of rotation is at a predetermined value, electrically operated valves connected with said switches, and a power-supply means for actuating the said valves when their corresponding circuit is closed by means of said switches.

10. Method of maintaining substantially constant the speed of extrusion of a body of plastic material composed of a solid and a liquid component which comprises substantially constantly blending said components at a predetermined rate to eventuate said plastic body, extruding said body to produce a moving column thereof, employing the variation in the movement of said body to control the supply of said liquid so as to increase it as the speed of movement decreases, and to decrease it as the speed of movement increases.

ALFRED F. C. LOTZ.
FRANK C. MAHONEY.

CERTIFICATE OF CORRECTION.

Patent No. 2,340,673. February 1, 1944.

ALFRED F. C. LOTZ, ET AL.

It is hereby certified that error appears in the printed specification of the above numbered patent requiring correction as follows: Page 7, second column, line 51, claim 3, for "regulate" read --actuate--; line 53, for "actuate" read --regulate--; and that the said Letters Patent should be read with this correction therein that the same may conform to the record of the case in the Patent Office.

Signed and sealed this 25th day of April, A. D. 1944.

Leslie Frazer

(Seal)                 Acting Commissioner of Patents.